United States Patent Office 3,407,579
Patented Oct. 29, 1968

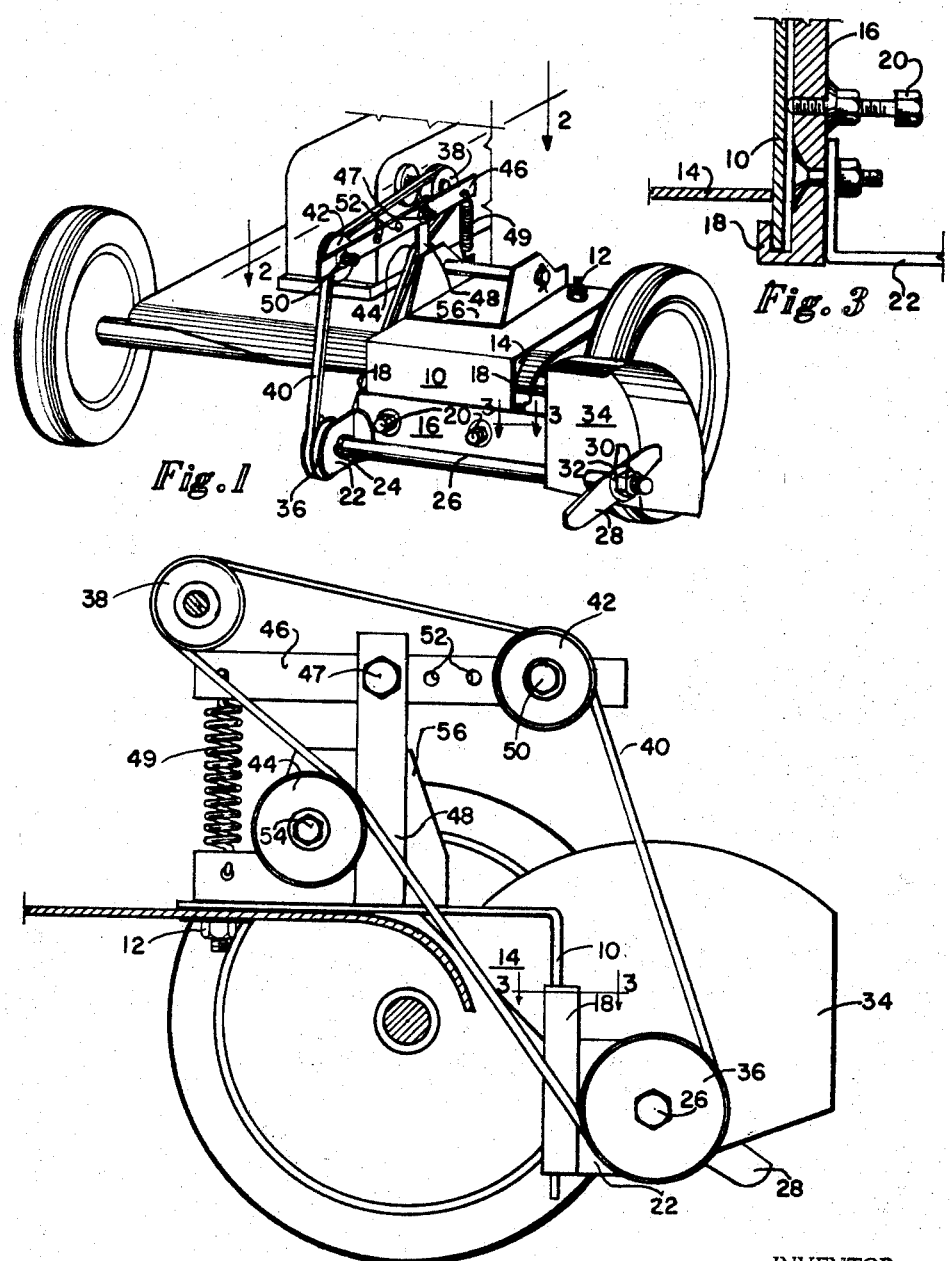

3,407,579
LAWNMOWER EDGER ATTACHMENT
Earl L. Decker, 1001 Colorado Blvd.,
Denver, Colo. 80206
Filed July 23, 1965, Ser. No. 474,359
2 Claims. (Cl. 56—256)

ABSTRACT OF THE DISCLOSURE

A lawn edger attachment for reel type power mowers with power take-off arrangement from the reel motor to the edger consisting of a belt and pulley drive and further including a tension pulley mounted on a spring biased pivoted tension arm for tightening the belt drive. The pivot point of the tension arm may be incrementally varied to provide an adjustment of the belt tension.

---

An important object of this invention is to provide an improved lower edger.

Another object is to provide an apparatus which is both economical and highly efficient.

These and other objects of the invention will become more fully apparent from the claims, and from the specification when read in conjunction with the drawings wherein:

FIGURE 1 is a front perspective view of this invention attached to the left front of a conventional reel type power driven lawnmower.

FIGURE 2 is a right end cross-sectional view of the driving means for the lawn edger.

FIGURE 3 is a cross-sectional view showing in detail the means to adjust the height or depth of cut of this lawn edger.

A typical basic embodiment of my invention is shown in FIGURE 1 with certain details of construction being shown in FIGURES 2 and 3, wherein mounting and height adjusting bracket 10 is semipermanently mounted upon and attached to the left front of the motor bed support of a conventional reel type power driven lawnmower by means of two bolts 12 with suitable washers and nuts thereon. I have found that a ¼" steel plate with two ⅛" angle reinforcing gussets 14 welded thereto near the right and left edges thereof has proved entirely satisfactory in my test operations of the working model of my invention for the mounting and height adjusting bracket 10. A vertically slidably adjustable bracket 16 with two slide channels 18 suitably placed on the reverse side thereof to cooperate with the vertical edges of bracket 10 provides means to adjust the height or depth of cut of my lawn edger when the two studs 20 threadedly mounted near the slide channels 18 on bracket 16 are tightened against the front of mounting bracket 10 at the desired height. Rotably mounted, either permanently or semipermanently whichever is desirable, on bracket 16 by means of the two angle brackets 22 with suitable bearings 24 therein is an edger shaft 26 with the edger blade 28 securely detachably attached thereto and rotably driven therewith near the left end thereof by means of the two nuts 30 threaded thereon in cooperation with the two washers 32, one nut and washer each on the inside and outside of the edge blade 28. The edger blade may be straight, curved or twisted whichever may be desirable for any specific application. Guard 34 attached at the blade 28 end of bracket 16 has been found entirely satisfactory to protect the operator from flying dirt, rocks and other material but can be further modified to protect bystanders if necessary or desirable. The shaft 26 and thereby the blade 28 is rotably driven by the rotably driven pulley 36 conventionally rigidly mounted at the right end of the shaft 26 in cooperation with the driving pulley 38 conventionally rigidly mounted on the motor shaft and the conventional belt 40 with the tension pulley 42 serving to keep the belt 40 tight in cooperation with the idler pulley 44 which idler pulley 44 is necessary to provide clearance for the rear edge of the belt 40 over the leading edge of the conventional motor bed support. The tension pulley 42 is rotably mounted at one end of the tension arm 46 pivotally mounted near the center of the tension arm 46 by means of a bolt and nut 47 to a suitable support bracket 48 integrally attached to the bracket 10. The coil spring 49, one end thereof attached to the bracket 10 and the other end thereof attached to the end of pivotally mounted tension arm 46 opposite to the tension pulley 42, provides a suitable and effective means of furnishing desired tension on the belt 40. A further incremental tension adjustment is provided and shown which is achieved by moving the tension pulley axle 50 from one to another of the several holes 52 provided in the tension pulley 42 end of the tension arm 46. The idler pulley 44 is rotably mounted on the bracket 10 by means of an axle 54 and the bracket 56 which is integrally attached to the bracket 10. I have found that the operation of my invention can be further improved by providing the tension pulley 42 and the idler pulley 44 with suitable bearings associated therewith, either, in cooperation with the rotating shafts and bearings, or, preferably with fixed axles with bearings incorporated within the tension pulley 42 and the idler pulley 44 as an integral part thereof.

The foregoing description of my invention will suggest various modifications to one skilled in the art. While there has been described what at present is considered to be the preferred embodiment of this invention it will be obvious to those skilled in the art that various changes and modifications may be made therein without departing from the invention. It is aimed, therefore, in the appended claims to cover all such changes and modifications which fall within the true spirit and scope of the invention.

What is claimed is:

1. A lawnmower edger attachment comprising in combination a mounting bracket semipermanently attached to the left front of the motor bed support of a conventional reel type power driven lawnmower, a vertically slidably adjustable depth of cut adjusting bracket with two slide channels on the reverse side thereof to cooperate with the vertical edges of the mounting bracket, an edger shaft rotably mounted on the depth of cut adjusting bracket with an edger blade securely detachably attached to the left end of the shaft whereby the edger blade is rotably driven with the shaft, and a rotably driven pulley rigidly mounted at the right end of the edger shaft cooperating with a driving pulley rigidly mounted on the motor shaft of the conventional reel type power driven lawnmower through a belt with a tension pulley serving to keep the belt tight in cooperation with an idler pulley whereby the edger blade is driven by the power source on the power driven lawnmower the tension pulley is rotably mounted at one end of a tension arm pivotally mounted near the center of the tension arm by means of a bolt and nut to a support bracket integrally attached to the mounting bracket, and wherein an incremental tension adjustment is provided by moving the tension pulley axle from one to another of the several holes provided in the tension pulley end of the tension arm.

2. A lawnmower edger attachment comprising in combination:
a mounting bracket adapted to be semipermanently attached to the front of the motor bed support of a conventional reel type power driven lawnmower, said mounting bracket having spaced parallel vertical sides;
a vertically slidable adjustable depth of cut adjusting bracket with slide channels adapted to cooperate with the vertical edges of the mounting bracket;

an edger shaft rotatably mounted on the depth of cut adjusting bracket with an edger blade detachably secured thereto;

a driven pulley mounted on said edger shaft operatively connected by means of a belt to the driving pulley of the motor of a conventional reel type power driven lawnmower; and a tension pulley and an idler pulley maintaining the belt tight whereby the edger blade is driven by the motor on the power driven lawnmower and wherein the tension pulley is rotatably mounted at one end of a tension arm which is pivotally supported on said mounting bracket for selective longitudinal positioning of said pulley along said tension arm to provide for incremental tension adjustment of the belt.

References Cited

UNITED STATES PATENTS

| | | | |
|---|---|---|---|
| 306,847 | 10/1884 | Mauck | 74—242.1 |
| 1,170,611 | 2/1916 | Coulbourn | 74—242.1 |
| 2,787,108 | 4/1957 | Meltzer | 56—25.4 |
| 2,908,127 | 10/1959 | Craig | 56—26 |
| 2,937,766 | 5/1960 | Penn | 248—245 |
| 2,939,262 | 6/1960 | Orr | 56—256 |
| 3,057,411 | 10/1962 | Carlton | 172—17 |

ABRAHAM G. STONE, *Primary Examiner.*

P. A. RAZZAND, *Assistant Examiner.*